United States Patent
Schunke et al.

(10) Patent No.: US 6,889,955 B2
(45) Date of Patent: May 10, 2005

(54) ADJUSTMENT DEVICE

(75) Inventors: Kurt Schunke, Minden (DE); Bernd Buchholz, Rahden (DE); Dieter Palm, Werther (DE); Gerhard Bruns, Bückeburg (DE)

(73) Assignee: RK Rose + Krüger GmbH & Co. KG Verbindungs- und Positioniersysteme, Minden (DE)

( * ) Notice: Subject to any disclaimer, the term of this patent is extended or adjusted under 35 U.S.C. 154(b) by 103 days.

(21) Appl. No.: 10/693,831

(22) Filed: Oct. 24, 2003

(65) Prior Publication Data

US 2004/0124385 A1 Jul. 1, 2004

Related U.S. Application Data

(63) Continuation of application No. PCT/EP02/03838, filed on Apr. 6, 2002.

(30) Foreign Application Priority Data

Apr. 27, 2001 (DE) ..................................... 201 07 325 U

(51) Int. Cl.⁷ ............................................. F16K 31/04
(52) U.S. Cl. ............................................. 251/129.11
(58) Field of Search ...................... 251/129.04, 129.11; 454/369; 318/663

(56) References Cited

U.S. PATENT DOCUMENTS

| 4,729,544 A | * | 3/1988 | Baumann ............... 251/129.05 |
| 4,926,903 A | * | 5/1990 | Kawai ......................... 137/554 |
| 5,137,257 A | * | 8/1992 | Tice ....................... 251/129.11 |
| 5,521,478 A |   | 5/1996 | Bernreuther et al. |
| 6,471,580 B2 | * | 10/2002 | Ro .............................. 454/69 |

FOREIGN PATENT DOCUMENTS

| DE | 41 13 510 A | 10/1992 |
| DE | 195 40 323 A | 4/1997 |
| DE | 197 19 991 A | 11/1998 |
| EP | 0 229 446 A | 7/1987 |
| EP | 0 617 213 A | 9/1994 |
| EP | 0 642 954 A | 3/1995 |

* cited by examiner

*Primary Examiner*—Edward K. Look
*Assistant Examiner*—John K. Fristoe, Jr.
(74) *Attorney, Agent, or Firm*—Henry M. Feiereisen

(57) ABSTRACT

An adjustment device for adjusting a control element of a flap valve in heating, ventilating and air-conditioning systems includes a drive motor, and a drive train in driving relationship with the drive motor. The drive train has an output member which is connected to a control element to be adjusted. A recorder is provided for recognizing and/or adjusting a position of the control element and/or a component of the drive train, wherein the recorder has a control member which is directly connected in form-fitting engagement with the output member of the drive train.

8 Claims, 1 Drawing Sheet

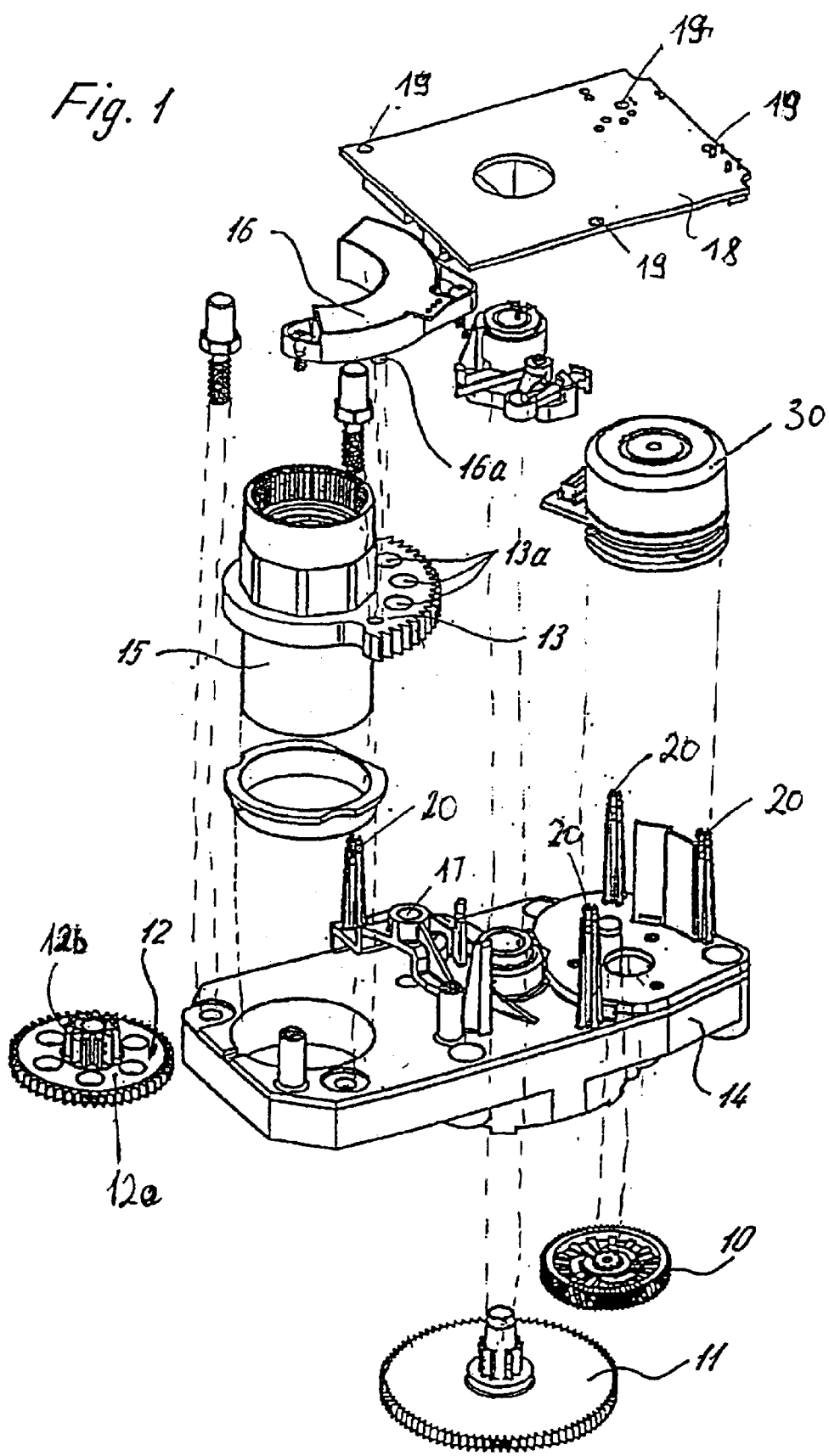

ADJUSTMENT DEVICE

CROSS-REFERENCES TO RELATED APPLICATIONS

This application is a continuation of prior filed copending PCT International application no. PCT/EP02/03838, filed Apr. 6, 2002, on which priority is claimed under 35 U.S.C. §120, the disclosure of which is hereby incorporated by reference.

This application claims the priority of German Patent Application, Serial No. DE 201 07 325.0, filed Apr. 27, 2001, pursuant to 35 U.S.C. 119(a)–(d), the disclosure of which is incorporated herein by reference.

BACKGROUND OF THE INVENTION

The present invention relates to an adjustment device, in particular for use with adjustable flap valves.

An adjustment device of a type involved here finds application especially in heating, air-conditioning and ventilation systems for opening and closing a control element of a flap valve. The respective adjusting movement depends hereby on the intended purpose. For example, in case of fire, it may be necessary to open or close the flap valves, whereby it is demanded that the pivoting movement of the control element should not be assumed by the drive motor but by an energy storage member, such as a tensed spring, so as to ensure execution of the necessary movement, even when the drive motor fails to operate as a consequence of external impacts, e.g. elevated temperature. The energy storage member is hereby biased when the control element is moved from the base position into the operative position that is normally assumed by the control element. It may, however, also be necessary to move the control element into different positions at short intervals in response to a change in temperature. These types of drives are called spring-return mechanisms.

Adjustment devices of the type involved here are typically installed in narrow spaces so that their compactness becomes an issue.

Oftentimes it is desired to ascertain the position of the control element or of a component of the drive train, or there may be a need to allow a movement of the control element or of a component of the drive train to a particular position. This is typically implemented by means of a recorder which is part of the adjustment device. Examples of recorders include a potentiometer or a variable resistor. In conventional adjustment devices, the potentiometer has a control member which is linked to a component of the drive train or to the control element via a respective gear mechanism or similar drive block. This approach results in an undesired increase in the number of components. Moreover, it is unavoidable that a gap between gear wheels or an elastic deformation of components adversely affects the outcome.

It would therefore be desirable and advantageous to provide an improved adjustment device which obviates prior art shortcomings and which is compact in structure, while yet being reliable in operation.

SUMMARY OF THE INVENTION

According to one aspect of the present invention, an adjustment device for adjusting a control element of a flap valve in heating, ventilating and air-conditioning systems, comprising a drive motor, a drive train in driving relationship with the drive motor, said drive train having an output member which is connected to a control element to be adjusted, and a recorder for recognizing and/or adjusting a position of the control element and/or a component of the drive train, said recorder having a control member which is directly connected in form-fitting engagement with the output member of the drive train.

The present invention resolves prior art shortcomings by directly coupling the control member of the recorder with a movable component of the drive train. As a result, the need for pins and bolts is eliminated and the number of gear wheel can also be reduced, so that the component number is minimized and the risk of a clearance between or elastic deformation of interacting components is also minimized. In addition, the minimum number of components leads to an extremely compact construction so that the field of application is greatly expanded. Suitably, the control member of the recorder is linked to the output member of the drive train. Thus, the recorder can be arranged in close proximity of the control element to be adjusted as the driving relationship between the output member of the drive train and the control element requires only few components. The output member of the drive train and the control member of the recorder can be connected in a form-fitting engagement. This can be implemented by providing the output member with at least one bore for snug engagement of a respective stem of the recorder. Of course, the reverse configuration is conceivable as well, i.e., the output member of the drive train has a stem for engagement in a bore of the control member of the recorder.

According to another feature of the present invention, the output member of the drive train may be formed as a tooth segment in which a hollow shaft is received which is formed with an internal profile for connection with the control element.

According to another feature of the present invention, the recorder may be a potentiometer of ring-shaped or segment-shaped configuration. Suitably, the potentiometer surrounds the shaft about a respective angle in proximity of the output member.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIG. 1 shows an exploded view of an adjustment device according to the present invention.

DETAILED DESCRIPTION OF PREFERRED EMBODIMENTS

The depicted embodiment is to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

This is one of four applications all filed on the same day. These applications deal with related inventions. They are commonly owned and have same inventive entity. These applications are unique, but incorporate the other by reference. Accordingly, the following U.S. patent applications are hereby expressly incorporated by reference: "Electromotive Adjustment Device", "Adjustment Drive" and "Electromotive Servo Drive", respectively.

Turning now to FIG. 1, there is shown an exploded view of an adjustment device according to the present invention, generally designated by reference numeral 1, for adjusting a control element of a flap valve in heating, ventilating and air-conditioning systems. The adjustment device 10 includes a gear mechanism to define a drive train and a drive motor 30 in driving relationship to the gear mechanism which is comprised of a plurality of gear wheels 10, 11, 12, 13 intermeshed with one another in such a manner that a rotation speed of the drive motor 30 is reduced. The gear wheels 10, 11, 12, 13 are supported by a carrier 14 which is disposed in a housing (not shown).

The gear wheel 12 is of double gear wheel construction and includes a gear wheel portion 12a and a gear wheel portion 12b. The gear wheel 13 is configured as a tooth segment and constitutes the output member of the drive train. The gear wheel 13 has a polygonal bore in which a hollow shaft 15 of complementary configuration is fitted. The hollow shaft 15 is circumscribed by a recorder 16 to display the respective position of the control element. An example of a recorder 16 used here is a segmental potentiometer 16 which is connected in form-fitting engagement with the gear wheel 13 and provided for determination or adjustment of a position of the control element. The potentiometer 16 is incorporated in a control loop and has a control member in the form of a stem 16a for engagement in one of four bores 13a in the gear wheel 13 (only three bores 13a are visible here). As the potentiometer 16 rotates in response to a rotation of the gear wheel 13, the resistance changes and a commensurate voltage signal of 0 to 10 volt is generated that is proportional to the rotation position of the stem 16a. Operation of the potentiometer 16 is generally known to the artisan and not described in more detail for the sake of simplicity.

As a result of its direct linkage with the gear wheel 13 as output member of the drive train, the potentiometer 16 can be disposed in proximity of the control element to be adjusted so that any inaccuracy as a result of an elastic deformation, if encountered at all, is negligible.

In the assembled state, the smaller gear wheel portion 12b of the gear wheel 12 is in mesh with the teeth of the gear wheel 13. On its side distal to the gear wheel portion 12b, the gear wheel 12 is formed with a pin (not shown) for insertion in an anchoring bore 17 on the carrier 14. FIG. 1 further shows a control board 18 which is formed with four bores 19 for engagement with four post 20 connected to the carrier 14. The gear wheels 10, 11 are disposed on an underside of the carrier 14, whereby the gear wheel 10 includes a freewheel. In general, as viewed from the drive motor 30, a gear wheel with greater partial circle diameter is always in mesh with a gear of smaller partial circle diameter to realize a greatest possible gear reduction.

The adjustment device 1 can be used as safety element for buildings, in which case all functional elements should be made of a temperature-resistant material, e.g. steel or non-ferrous heavy metal.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An adjustment device for adjusting a control element of a flap valve in heating, ventilating and air-conditioning systems, comprising:

a drive motor;

a drive train in driving relationship with the drive motor, said drive train having an output member which is connected to a control element to be adjusted; and a recorder for recognizing and/or adjusting a position of the control element and/or a component of the drive train, said recorder having a control member which is directly connected in form-fitting engagement with the output member of the drive train in the absence of an intervening gear mechanism.

2. The adjustment device of claim 1, wherein the form-fitting engagement is realized through bores and a stem.

3. The adjustment device of claim 1, wherein the output member has at least one bore, and the control member of the recorder has a stem for engagement into the bore.

4. The adjustment device of claim 1, wherein the recorder is a potentiometer of ring-shaped or segment-shaped configuration.

5. The adjustment device of claim 1, and further comprising a hollow shaft fitted in the output member in a form-fitting and/or force-locking manner, wherein the hollow shaft and the control member have complementary internal profiling.

6. The adjustment device of claim 5, wherein the recorder is arranged directly adjacent to the output member and at least partially surrounds the hollow shaft.

7. The adjustment device of claim 6, wherein the recorder completely surrounds the hollow shaft.

8. The adjustment device of claim 5, wherein the output member of the drive train is formed as a tooth segment in which the hollow shaft is fitted.

* * * * *

UNITED STATES PATENT AND TRADEMARK OFFICE
CERTIFICATE OF CORRECTION

PATENT NO. : 6,889,955 B2  
DATED : May 10, 2005  
INVENTOR(S) : Kurt Schunke et al.

It is certified that error appears in the above-identified patent and that said Letters Patent is hereby corrected as shown below:

<u>Title page,</u>
Item [73], Assignee, should read
-- RK Rose + Krieger GmbH & Co. KG
  Verbindungs- und Positioniersysteme --.

Signed and Sealed this

Second Day of May, 2006

JON W. DUDAS
*Director of the United States Patent and Trademark Office*